Patented Mar. 1, 1938

2,109,954

UNITED STATES PATENT OFFICE 2,109,954

OXIDATION OF ALKYL PYRIDINES AND ALKYL QUINOLINES

Charles B. Biswell and Walter V. Wirth, Woodstown, N. J., assignors to E. I. du Pont de Nemours & Company, Wilmington, Del., a corporation of Delaware No Drawing. Application December 18, 1936, Serial No. 116,647

10 Claims. (Cl. 260—42)

This invention relates to N-heterocyclic carboxylic acids and their salts, more particularly to pyridine carboxylic acids and their salts and specifically to picolinic acid and its salts and to processes for the manufacture thereof.

It is known that alkyl pyridines may be oxidized to pyridine carboxylic acids by means of alkaline potassium permanganate. It is also known that carboxylic acids having a pyridine structure are formed by the oxidation with potassium permanganate of quinoline, isoquinoline, quinaldines, naphthoquinolines and other condensed ring compounds containing a pyridine structure.

Alpha-picoline has been oxidized to picolinic acid by means of alkaline potassium permanganate in dilute solution at the boiling point or at somewhat lower temperatures for example 65 to 70° C. The picolinic acid has been isolated by neutralizing the aqueous filtrate from the oxidation to a pH of 7-8, concentrating to a solution of approximately 20% picolinic acid and precipitating with a hot concentrated solution of copper sulfate.

Oxidation in acid solutions with potassium permanganate has, however, not been successful. Thus Delepine—Comptes rendus 184 206–8 (1927) found that potassium permanganate in the presence of an equivalent amount of sulfuric acid oxidized alpha-picoline to acetic and formic acids, carbon dioxide and ammonia.

It is an object of this invention to provide a new and improved process for the production of carboxylic acids containing a pyridine structure. Another object is the provision of a new and improved process for the oxidation of alpha-picoline to picolinic acid, whereby higher yields of product are obtained than by means previously described. A further object is the development of methods whereby picolinic acid may be isolated in the form of insoluble salts of high purity. Other objects will appear hereinafter.

These objects are accomplished by the following invention wherein picoline, alkyl pyridines, or alkyl quinolines are oxidized by adding to the fused sulfate of the N-heterocyclic compound a slurry of manganese dioxide in strong sulfuric acid preferably in such amount that the sulfuric acid concentration in the reaction mixture remains constant. A further phase of the invention is a new process for the isolation of the pyridine-carboxylic acid from the oxidation mixture by neutralizing with calcium carbonate and precipitating the product from the slightly acidified filtrate by means of a solution of a metal salt, e. g. copper sulfate.

In the process of the present invention sufficient monohydrate (100% sulfuric acid) is added to alpha-picoline to make alpha-picoline sulfate. The reaction vessel is heated to keep the alpha-picoline sulfate molten. A suspension of manganese dioxide in 100% $H_2SO_4$ is added gradually to the picoline sulfate at a sufficiently elevated temperature to cause the $MnO_2$ to react at about the same rate as it is fed in. The amount of 100% sulfuric acid added with the manganese dioxide is such that the concentration of free sulfuric acid in the reaction mass is always about constant, due to the dilution of the acid with water formed in the reaction.

After the oxidation is complete, the mass is diluted with water. Calcium carbonate is added to neutralize the sulfuric acid acidity, and the precipitate of calcium sulfate is filtered from the solution of manganese picolinate and manganese sulfate. Copper sulfate is added to the solution containing the manganese picolinate to precipitate the insoluble copper picolinate, which is filtered off and washed.

The oxidation proceeds according to the following equation:

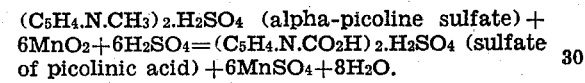

$(C_5H_4.N.CH_3)_2.H_2SO_4$ (alpha-picoline sulfate) + $6MnO_2 + 6H_2SO_4 = (C_5H_4.N.CO_2H)_2.H_2SO_4$ (sulfate of picolinic acid) $+ 6MnSO_4 + 8H_2O$.

The preferred method of operation is shown in the following example which is illustrative and not limitative.

Ninety-three parts by weight (one mol.) of alpha-picoline was charged into a well stirred reaction vessel. Fifty parts by weight (one half mol.) of 100% sulfuric acid was added gradually, the temperature being kept slightly below 80° C. The alpha-picoline sulfate was then heated to about 110° C. A suspension of 274 parts by weight (3.15 mols) of manganese dioxide in 402 parts by weight (4.1 mols) of 100% sulfuric acid was added gradually over a period of 3½ to 4½ hours, the temperature of the reaction mass being raised to 130° C. at the start of the $MnO_2$ addition, maintained at 130–140° C. while the remainder of the $MnO_2$-$H_2SO_4$ mixture was added, and maintained at 135–140° C. for 3 to 6 hours after the addition was completed.

The mass was cooled to 95–100° C. and 100 parts by weight of water was added. The diluted charge was then added to about 800 parts by weight of water. Calcium carbonate (ground limestone) was added gradually at 80–90° C. until the mass tested neutral on Congo red paper. The calcium sulfate precipitate was filtered off and washed with hot water to remove all the manganese picolinate. The wash liquor was combined with the strong filtrate, and a small amount of sulfuric acid was added to make the solution containing manganese picolinate and manganous sulfate slightly acid to Congo red paper. At 60-80° C., a solution of 100 parts by weight of copper sulfate pentahydrate in 150 parts by weight of boiling water, was added gradually to precipitate the insoluble copper picolinate. The mass was cooled to 20° C. and the copper picolinate was filtered off, washed free of manganese sulfate, and dried at 60-70° C.

One hundred sixteen to one hundred nineteen parts by weight of copper picolinate (mol. wt. 307.6) of 96 to 98% purity were obtained. The conversion yield was 73 to 75% from alpha-picoline (mol. wt. 93).

It will be recognized that while the example describes the isolation of the picolinic acid as a copper salt, which is preferred because it is most insoluble and precipitates in a crystalline, readily filtered, and readily washed condition, other insoluble salts may be precipitated from the concentrated solution of soluble picolinic acid salts. Among the other insoluble salts which may be precipitated are the calcium, magnesium, cadmium, ferric, barium and tin salts, the precipitating agents being compounds of corresponding metals which are water-soluble.

The procedure of the example may be modified by replacing the 100% sulfuric acid with strong sulfur acid of 90 to 102%. The amount of $H_2SO_4$ may be varied by adding more or less acid with the manganese dioxide or by using a different concentration of $H_2SO_4$ for slurrying the manganese dioxide. The $H_2SO_4$ in the reaction mass may be above (e. g. 80% $H_2SO_4$) or below (e. g. 40% $H_2SO_4$) the concentration disclosed in the above example depending upon the ability of the equipment to withstand those concentrations. (The yields of picolinic acid are not as good at these extreme concentrations but are 60% or above.)

The oxidation temperature may be varied within the limits 130 and 160° C. Below 130° C., the oxidation takes place so slowly that the operation is not commercially feasible whereas above 160° C., the yield drops off because of oxidative destruction of the pyridine nucleus.

Although the foregoing example illustrates the invention only as it is applied to the alpha-methyl derivative of pyridine, it may be applied to beta picoline and other alkyl pyridines as, for example, compounds having the structure:

in which at least one of the numbered positions indicated by $X_2$, $X_3$, $X_4$, $X_5$, $X_6$ is an alkyl, i. e. an open chain, radical. Specific examples of compounds falling within this general formula are: 3-methylpyridine, 4-methylpyridine, 2:3 dimethylpyridine, 2:4-dimethylpyridine, 2:5-dimethylpyridine, 2:6-dimethylpyridine, 3:4-dimethylpyridine, 3:5-dimethylpyridine, 2-ethylpyridine, symmetrical 2:4:6-trimethylpyridine, 2:3:4-trimethylpyridine, 2:4:6-trimethylpyridine, 2-methyl-5-ethylpyridine, 2-methyl-6-ethylpyridine, 3-methyl-4-ethylpyridine, 2-propylpyridine, 2-isopropylpyridine, 4-propylpyridine, 4-isopropylpyridine, butylpyridine and higher alkyl pyridines. Similarly, the invention may be applied to alkyl substituted condensed ring systems containing the pyridine structure, such as: quinaldine, alpha-beta-dimethylquinoline, alpha-gamma-dimethylquinoline, beta-gamma-dimethylquinoline, alpha-ethylquinoline, gamma-propylquinoline, trimethylquinolines, tetra-methylquinolines, tetramethyldipyridyl, and other condensed ring homologues. From the methylpyridines, the corresponding pyridine carboxylic acids are produced by the oxidation of the alkyl group.

The alkyl pyridines and particularly the methyl pyridines, because of their availability, cost and ease of oxidation in the process of the present invention, are preferred.

The invention provides a method of producing compounds of the character above described in high yields. By the application of the invention, alpha-picoline may be oxidized to picolinic acid with higher yields, considering the high degree of purity, than are obtainable by the methods previously known. Furthermore, insoluble salts of picolinic acid are obtained in good purity. These salts are useful in the preparation of dyes and dye intermediates. The process is especially desirable since it may be operated with satisfactory results on a large scale.

Although the oxidation of picoline and similar compounds by adding manganese dioxide powder to picoline and the like dissolved in a large excess of concentrated sulfuric acid as claimed by Dahlen and Detrick in their application Serial No. 116,648 filed of even date herewith represents a considerable advance, the present invention is a further improvement thereon since in the present invention the process is readily controlled in view of the absence of large amounts of unreacted manganese dioxide which can react suddenly when the temperature is raised because of the exothermic nature of the reaction. By the gradual addition of manganese dioxide, suspended in sulfuric acid, at a temperature where the reaction takes place as the manganese dioxide is added, there is built up no great excess of manganese dioxide and the temperature is therefore readily controlled. Failure of stirring mechanism is therefore of relatively little importance in the process of this invention.

The addition of the manganese dioxide-sulfuric acid slurry further avoids local overheating and over-oxidation, and allows a closer control of acid concentration avoiding the wide change of acid concentration inherent in the addition of manganese dioxide to the picoline dissolved in the total sulfuric acid employed. The acid concentration in the present process may be held within narrower limits and therewith the temperature thus avoiding the temperature variation necessary in the process wherein manganese dioxide is added in the solid form in order to obtain adequate yields. The process of the present invention produces less undesired by-products and therefore obtains higher yields.

According to our process, where the manganese dioxide-sulfuric acid slurry is fed into picoline sulfate, the temperature is held fairly constant at the point where the reaction proceeds about as fast as the slurry is fed in and where the acid concentration in the reactor remains about constant at 60% $H_2SO_4$ with respect to the water formed during the reaction. This makes the selection of the material of construction for the reactor less difficult, since we are dealing with a fairly constant acid concentration. The process of Dahlen and Detrick, Serial No. 116,648, filed of even date herewith requires a material to stand hot sulfuric acid which varies from 90% to 40% strength.

The present process is of further advantage in that thereby there may be obtained yields as high as 73-75% of the picoline entering the process while the process employing manganese dioxide solid obtains yields of about 50% and requires a process for recovering the unused picoline if full economies are to be effected. The $H_2SO_4$ concentration cannot vary very greatly from the 60% of the example if yields are to be as high as 73-75%. The yields using this process are at least 60% even at the ends of the $H_2SO_4$ concentration range of 40 to 80%. These concentrations also introduce equipment difficulties so that $H_2SO_4$ concentrations of about 60% are very much preferred.

The method of isolation employed in the present invention is much simpler than that hitherto used. The employment of calcium carbonate alone instead of sodium carbonate, followed by calcium carbonate and then by lime is not only less expensive, less time consuming and simpler but also avoids the voluminous precipitate of calcium sulfate plus manganous hydroxide which is difficult to filter and to wash. The manganese sulfate solution may be treated for manganese recovery. The calcium sulfate precipitate obtained in the present process is readily filtered and washed.

The above description and examples are intended to be illustrative only. Any modification of or variation therefrom which conforms to the spirit of the invention is intended to be included within the scope of the claims.

We claim:

1. Process of preparing picolinic acid which comprises mixing 93 parts of alpha-picoline with 50 parts of 100% sulfuric acid while maintaining the temperature below 80° C. then heating to 110° C., adding a suspension of 274 parts by weight of manganese dioxide suspended in 402 parts by weight of 100% sulfuric acid gradually over 3½ to 4½ hours while maintaining the temperature at 130-140° C. and thereafter heating the mixture at 135-140° C. for 3 to 6 hours, cooling to 95-100° C. adding 100 parts by weight of water, adding to 800 parts by weight of water, adding calcium carbonate at 80-90° C. until the reaction mixture was neutral to Congo red, filtering and washing the precipitate making the filtrate and washings acid to Congo red and precipitating at 60-80° C. with a solution of 100 parts by weight of copper sulfate pentahydrate in 150 parts by weight of boiling water, cooling to 20° C. and filtering and washing the copper picolinate.

2. Process of preparing picolinic acid which comprises reacting one mol. of alpha-picoline with one-half mol. 100% sulfuric acid below 80° C. and gradually adding to the picoline sulfate thus formed, a suspension of three mols of manganese dioxide in four mols of 100% sulfuric acid, keeping the temperature of the reaction mixture at 130-140° C. during the addition of the manganese dioxide suspension and at 135-140° C. for at least three hours thereafter, neutralizing the mixture with calcium carbonate and precipitating the picolinic acid from the diluted filtrate by means of copper sulfate.

3. In a process for the preparation of picolinic acid the step which comprises reacting alpha-picoline sulfate at 130-140° C. with a previously formed slurry of manganese dioxide in concentrated sulfuric acid in amount sufficient to keep the concentration of sulfuric acid substantially constant in the reaction mixture.

4. In a process for the preparation of picolinic acid, the step which comprises oxidizing fused alpha-picoline sulfate with a preformed suspension of manganese dioxide in concentrated sulfuric acid.

5. In a process for the preparation of nicotinic acid, the step which comprises oxidizing fused beta-picoline sulfate with a preformed suspension of manganese dioxide in concentrated sulfuric acid.

6. In a process for the preparation of a pyridine monocarboxylic acid, the step which comprises oxidizing a fused sulfate of a picoline with a preformed suspension of manganese dioxide in concentrated sulfuric acid.

7. In a process for the preparation of a pyridine monocarboxylic acid, the step which comprises oxidizing a fused sulfate of an alkyl pyridine with a preformed suspension of manganese dioxide in concentrated sulfuric acid.

8. In a process for the preparation of a pyridine carboxylic acid, the step which comprises oxidizing a fused sulfate of a compound from the class consisting of alkyl pyridines and alkyl quinolines with a preformed suspension of manganese dioxide in concentrated sulfuric acid.

9. In a process for the preparation of picolinic acid by oxidation of alpha-picoline with manganese dioxide in the presence of sulfuric acid, the step which comprises isolating the picolinic acid by neutralizing the reaction product with calcium carbonate and precipitating the picolinic acid as copper picolinate from the filtrate therefrom.

10. In a process for the preparation of a pyridine carboxylic acid by oxidation of a sulfate of a member of the class consisting of alkyl pyridines and alkyl quinolines, the step which comprises isolating the pyridine carboxylic acid by neutralizing the reaction product with calcium carbonate and precipitating the pyridine carboxylic acid as an insoluble salt from the filtrate therefrom.

CHARLES B. BISWELL.
WALTER V. WIRTH.

CERTIFICATE OF CORRECTION.

Patent No. 2,109,954.   March 1. 1938.

CHARLES B. BISWELL, ET AL.

It is hereby certified that error appears in the printed specification of the above numbered patent requiring correction as follows: Page 2, first column, line 35, for "sulfur" read sulfuric; and that the said Letters Patent should be read with this correction therein that the same may conform to the record of the case in the Patent Office.

Signed and sealed this 3d day of May, A. D. 1938.

(Seal)

Henry Van Arsdale,
Acting Commissioner of Patents.